United States Patent
Gumaste et al.

(10) Patent No.: US 7,787,763 B2
(45) Date of Patent: Aug. 31, 2010

(54) SYSTEM AND METHOD FOR PROTECTING OPTICAL LIGHT-TRAILS

(75) Inventors: Ashwin A. Gumaste, Dallas, TX (US); Paparao Palacharla, Richardson, TX (US); Susumu Kinoshita, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 996 days.

(21) Appl. No.: 11/098,720

(22) Filed: Apr. 4, 2005

(65) Prior Publication Data
US 2006/0222360 A1    Oct. 5, 2006

(51) Int. Cl.
*H04B 10/00* (2006.01)
(52) U.S. Cl. .................. 398/4; 398/5; 398/167
(58) Field of Classification Search ............. 398/3–5, 398/167
See application file for complete search history.

(56) References Cited

U.S. PATENT DOCUMENTS

| | | | |
|---|---|---|---|
| 4,651,316 A |  | 3/1987 | Kocan et al. ............. 370/462 |
| 5,258,978 A |  | 11/1993 | Cloonan et al. ........... 370/411 |
| 5,442,623 A | * | 8/1995 | Wu ........................ 370/224 |
| 5,469,428 A | * | 11/1995 | Tokura et al. ............. 370/224 |
| 5,724,166 A |  | 3/1998 | Nakata |
| 5,854,700 A |  | 12/1998 | Ota |
| 5,903,371 A | * | 5/1999 | Arecco et al. ............... 398/4 |
| 6,160,648 A | * | 12/2000 | Oberg et al. ............... 398/4 |
| 6,169,746 B1 |  | 1/2001 | Ueda et al. ............... 370/466 |
| 6,195,186 B1 |  | 2/2001 | Asahi |
| 6,504,849 B1 |  | 1/2003 | Wang et al. ............... 370/455 |
| 6,567,194 B1 |  | 5/2003 | Badr ........................ 398/1 |
| 6,594,232 B1 | * | 7/2003 | Dupont .................... 370/224 |
| 6,631,134 B1 |  | 10/2003 | Zadikian et al. |
| 6,701,085 B1 | * | 3/2004 | Muller ....................... 398/4 |
| 6,728,484 B1 |  | 4/2004 | Ghani ....................... 398/42 |
| 6,766,113 B1 |  | 7/2004 | Al-Salameh et al. |
| 6,775,477 B2 |  | 8/2004 | Badr ........................ 398/1 |
| 6,782,198 B1 | * | 8/2004 | Liu .......................... 398/3 |
| 6,795,394 B1 | * | 9/2004 | Swinkels et al. .......... 370/222 |
| 6,850,711 B2 |  | 2/2005 | Tsuruta .................... 398/168 |
| 6,882,799 B1 |  | 4/2005 | Beshai et al. |
| 6,889,007 B1 |  | 5/2005 | Wang et al. ................ 398/79 |

(Continued)

FOREIGN PATENT DOCUMENTS

WO    WO 03104849 A2  *  12/2003

OTHER PUBLICATIONS

Ramaswami, Rajiv and Kumar Sivarajan. Optical Networks: A Practical Perspective, First Edition. Morgan Kauffman Publications, 1998.*

(Continued)

*Primary Examiner*—Leslie Pascal
(74) *Attorney, Agent, or Firm*—Baker Botts L.L.P.

(57) ABSTRACT

Providing protection for a network includes establishing a light-trail through a sequence of nodes of an optical network, where the sequence of nodes is coupled by a first fiber and by a second fiber. Traffic is communicated through a plurality of connections of the light-trail, where a connection is operable to communicate traffic from a source node of the sequence of nodes to one or more destination nodes of the sequence of nodes. A failure of the light-trail is detected. A protection light-trail corresponding to the light-trail is established. The traffic of the plurality of connections is communicated through the protection light-trail.

23 Claims, 4 Drawing Sheets

U.S. PATENT DOCUMENTS

| | | | |
|---|---|---|---|
| 7,016,363 | B1 | 3/2006 | Reed et al. |
| 7,023,796 | B2 * | 4/2006 | De Girolamo et al. ...... 370/222 |
| 7,031,299 | B2 | 4/2006 | Chaudhuri et al. |
| 7,088,920 | B2 | 8/2006 | Krishnaswamy et al. |
| 7,184,663 | B2 | 2/2007 | Kinoshita et al. |
| 7,218,854 | B1 | 5/2007 | Unitt et al. |
| 7,266,296 | B2 | 9/2007 | Ovadia et al. |
| 7,308,198 | B1 * | 12/2007 | Chudak et al. ............ 398/58 |
| 2002/0114030 | A1 | 8/2002 | Dwivedi et al. |
| 2003/0189920 | A1 | 10/2003 | Erami et al. |
| 2003/0223104 | A1 | 12/2003 | Kinoshita et al. |
| 2003/0223682 | A1 | 12/2003 | Kinoshita et al. |
| 2003/0235153 | A1 | 12/2003 | Lee et al. |
| 2004/0034753 | A1 | 2/2004 | Jeddeloh |
| 2004/0052530 | A1 * | 3/2004 | Tian et al. ............... 398/83 |
| 2004/0234263 | A1 | 11/2004 | Ovadia et al. |
| 2004/0252995 | A1 | 12/2004 | Ovadia et al. |
| 2005/0013613 | A1 | 1/2005 | Stevenson et al. |
| 2005/0088964 | A1 | 4/2005 | Yang et al. |
| 2005/0191054 | A1 | 9/2005 | Aoki et al. |
| 2006/0013584 | A1 | 1/2006 | Miyazaki |
| 2006/0056279 | A1 | 3/2006 | Pronk et al. |
| 2006/0188258 | A1 | 8/2006 | Gumaste et al. |
| 2006/0210268 | A1 | 9/2006 | Gumaste et al. |
| 2006/0210273 | A1 | 9/2006 | Gumaste et al. |
| 2006/0222360 | A1 | 10/2006 | Gumaste et al. |
| 2006/0228112 | A1 | 10/2006 | Gumaste et al. |
| 2006/0245755 | A1 | 11/2006 | Gumaste et al. |
| 2007/0019662 | A1 | 1/2007 | Gumaste et al. |
| 2007/0047958 | A1 | 3/2007 | Gumaste et al. |
| 2007/0121507 | A1 | 5/2007 | Manzalini et al. |
| 2007/0255640 | A1 | 11/2007 | Gumaste et al. |

OTHER PUBLICATIONS

Banaerjee et al., "Generalized Multiprotocol Label Switching: An Overview of Routing and Management Enhancements,"IEEE Communications Magazine, Jan. 2001, pp. 144-149.

Bertsekas, Dimitri, "The Auction Algorithm: A Distributed Relaxation Method for the Assignment Problem," Report LIDS-P-1653, Mar. 1987, Revised Sep. 1987, pp. 1-27.

Chlamtac et al., "Bandwidth Management in Community Networks," Center for Advance Telecommunications Systems and Services, pp. 1-11, 2002, IWDC, LNCS 2571.

Chlamtac et al., Lightpath Communications: An Approach to High Bandwidth Optical WAN's, IEEE Transactions on Communications, vol. 40, No. 7, Jul. 1992, pp. 1171-1182.

Chlamtac et al., "Light-Trails: A Solution to IP Centric Communication in the Optical Domain," 11 pages, Center for Advance Technology Systems and Services, University of Texas at Dallas, Texas 75083, USA, Quality of Service in Multiservice IP Networks, Second International Workshop, QoS-1P, Feb. 2003.

Dolzer et al., "Evaluation of Reservation Mechanisms for Optical Burst Switching," 8 pages, 2001, AEU Int. J. Electron. Commun. 55 No. 1, 1-1.

Fang et al., "Optimal Light Trail Design in WDM Optical Networks," IEEE Communications Society, 2004 IEEE, pp. 1699-1703.

Foster, "The Grid Blue Print for a New Computing Infrastructure," Morgan Kauffman, Nov. 1998, pp. 479-532.

Frederick et al., "Light Trails: A Sub-Wavelength Solution for Optical Networking," 2004 IEEE, 2004 Workshop on High Performance Switching and Routing, Apr. 19-21, 2004.

Fumagalli et al., "The Multi-Token Inter-Arrival Time (MTIT) Access Protocol for Supporting IP over WDM Ring Network," 1999 IEEE, pp. 586-590.

Ghani et al., "On IP-Over-WDM Integration," IEEE Communications Magazine, Mar. 2000, pp. 72-84, WDM Optical Networks: A Reality Check.

Gumaste et al., "A Scheduling Procedure for Control Signaling in Optical Burst Switched Network," in Proceedings for the First International Conference on Optical Communications and Networks, Nov. 11-14, 2002, pp. 190-193.

Gumaste et al., Bifurcated Traffic and Channel Assignment (BITCA) to Interconnected Metro Rings, 3 pages, OFC 2002.

Gumaste et al., "Light-Frames: A Pragmatic Framework for Optical Packet Transport," IEEE Communications Society, pp. 1537-1542, 2004.

Gumaste et al., "Light-Trail and Light-Frame Architectures for Optical Networks," PHD Thesis, University of Texas Dallas, Dec. 2003.

Gumaste et al., "Light-Trails: A Novel Conceptual Framework for Conducting Optical Communications," Center for Advanced Telecommunications Services and Studies, 7 pages, 2003.

Gumaste et al., Light Trails: An Optical Solution for IP Transport, J. Opt. Net., vol. 3, 2004, pp. 261-281, Center for Advanced Telecommunications Systems and Services, The University of Texas at Dallas, May 2004, vol. 3, No. 5, Journal of Optical Networking, pp. 261-281.

Gumaste et al., "Next-Generation Optical Storage Area Networks: The Light-Trails Approach," Optical Storage Area Networks, IEEE Communications Magazine, Mar. 2005, pp. 72-79.

Gumaste et al., "Providing Bandwidth on Demand to End-Users by Adaptations to a GMPLS Framework: The Light-Trails Approach," National Fiber Optics Engineers Conference, 2003 Technical Proceedings, pp. 1137-1141.

Humblet, "Models of Blocking Probability in All-Optical Networks With and Without Wavelength Changers," IEEE Journal on Selected Areas in Communications, Jun. 1996, vol. 14, No. 5, ISACEM, 11 pages.

Kinoshita, S.. "Broadband Fiber Optic Amplifiers," OFC 2001, Optical Fiber Communications Conference and Exhibit, Mar. 17-22, 2001, 5 pages.

Ota et al., "High-Speed, Burst-Mode, Packet-Capable Optical Receiver and Instantaneous Clock Recovery for Optical Bus Operation," Journal of Lightwave Technology, vol. 12, No. 2, Feb. 1994, pp. 325-331.

Qiao et al., "On an IP-Centric Optical Control Plane" Intelligence in Optical Networks, IEEE Communication Magazine, Sep. 2001, pp. 88-93.

Ramaswami et al., "Routing and Wavelengths Assignment in All-Optical Networks," IEEE/ACM Transactions on Networking, Oct. 1995, vol. 5, No. 3, pp. 489-500.

Resilient Packet Ring Alliance, "An Introduction to Resilient Packet Ring Technology," A White Paper by the Resilient Packet Ring Alliance, Oct. 2001, pp. 1-16.

Sahasrabuddhe et al., "Fault Management in IP-Over-WDM Networks: WDM Protection versus IP Restoration," IEEE Journal on Selected Areas in Communications, vol. 20, No. 1, Jan. 2002, pp. 21-33.

Sasaki et al., "The Interface Between IP and WDM and Its Effect on the Cost of Survivability," IEEE Commununications Magazine, Jan. 2003, World Telecommunications Congress 2002 (WTC 2002), pp. 74-79.

Shrinkhande et al., "CSMA/CA MAC Protocols for IP HORNET: An IP HORNET: An IP Over WDM Metropolitan Area Ring Network," Stanford University Optical Communications Research Laboratory, 5 pages, 2000.

Tancevski et al., "Optical Routing as Asynchronous, Variable Length Packets," IEEE Journal on Selected Areas in Communications, vol. 18, No. 10, Oct. 2000, pp. 2084-2093.

Verma et al., "Optical Burst Switching: A Viable Solution for Terabit IP Backbone," IEEE Network Magazine, vol. 14, No. 6, Nov./Dec. 2000, pp. 48-53.

Yoo et al., "Just Enough Time (JET): A High Speed Protocol for Bursty Traffic in Optical Networks,:" Proc. IEE/LEOS Tech. G11, Aug. 1997, pp. 26-27.

Zhang et al., "Differentiated Multi Layer Survivability in IP/WDM Networks," in Network Operations and Management Symposium, IEEE, New York, 2002, pp. 681-696.

Zhang et al., "A Heuristic Wavelength Assignment Algorithm for Multihop WDM Networks with Wavelength Routing and Wavelength Reuse," in Proc. INFOCOM 94, 1994, pp. 534-543.

Gumaste, "Method and System for Time Sharing Transmission Frequencies in an Optical Network," U.S. Appl. No. 11/061,255, filed Feb. 18, 2005.

Gumaste, "System and Method for Implementing Optical Light-Trails," U.S. Appl. No. 11/080,051, filed Mar. 15, 2005.

Gumaste, "System and Method for Implementing Optical Light-Trails," U.S. Appl. No. 11/080,752, filed Mar. 15, 2005.

Gumaste, "System and Method for Bandwidth Allocation in an Optical Light-Trail," U.S. Appl. No. 11/218,262, filed Aug. 13, 2005.

Gumaste, "System and Method for Transmission and Reception of Traffic in Optical Light-Trails," U.S. Appl. No. 11/095,246, filed Mar. 30, 2005.

Gumaste, "System and Method for Shaping Traffic in Optical Light-Trails," U.S. Appl. No. 11/118,899, filed Apr. 29, 2005.

Gumaste, "Heuristical Assignment of Light-Trails in a Optical Netowrk," U.S. Appl. No. 11/185,958, filed Jul. 19, 2005.

Gumaste, "System and Method for Bandwidth Allocation in an Optical Light-Trail," U.S. Appl. No. 11/380,812, filed Apr. 28, 2006.

Ashwin Gumaste, et al., "*Light-frames: A Pragmatic Framework for Optical Packet Transport*", IEEE Communications Society, © 2004 IEEE, pp. 1537-1542, Printed Apr. 2005.

U.S. Appl. No. 11/080,752 entitled, "*System And Method For Implementing Optical Light-Trails*", 44 pages specification, claims and abstract, 5 pages of drawings, inventors Ashwin A. Gumaste et al., Mar. 15, 2005.

Dutton et al., "Understanding Optical Communications," IBM International Technical Support Organization, Sep. 1998, p. 9, 366, and 367 (3 pages).

Maille et al., "Multi-Bid Auctions for Bandwidth Allocation in Communications Networks," INFOCOM 2004, Mar. 7-11, 2004, vol. 4, pp. 54-65.

Chiang et al., "Balancing Supply and Demand of Bandwidth in Wireless Cellular: Networks: Utility Maximization Over Powers and Rates," INFOCOM 2004, Mar. 7-11, 2004, vol. 4, pp. 2800-2811.

Gumaste et al., "Mesh Implementation of Light Trails: A Solution to IP Centric Communication," Computer Communications and Networks, 2003, ICCCN 2003, The 12th International Conference, Oct. 20, 2003 through Oct. 22, 2003, 7 pages.

Gumaste et al., "Optimizing Light-Trail Assignment to WDM Networks for Dynamic IP Centric Traffic," Local and Metropolitan Area Networks, 2004, LANMAN 2004, The 13th Workshop, Apr. 25, 2004 through Apr. 28, 2004, 7 pages.

Gumaste et al., "Optical Implementation of Resilient Packet Rings Using Light-Trails," *Optical Fiber Communication Conference and Exposition and The National Fiber Optic Engineers Conference*, Technical Digest (CD) (Optical Society of America, 2005), paper NThI3, 8 pages, http://www.opticsinfobase.org/abstract.cfm?URI=NFOEC-2005-NThI3, 2005.

Spadaro et al., "Positioning of the RPR Standard in Contemporary Operator Environments," IEEE Network, vol. 18, Issue 2, 11 pages, Mar. 2004.

Yener et al., "Flow Trees: A Lower Bound Computation Tool for Network Optimization," Columbia University of Computer Science, 21 pages 1994.

\* cited by examiner

SYSTEM AND METHOD FOR PROTECTING OPTICAL LIGHT-TRAILS

TECHNICAL FIELD

The present invention relates generally to optical networks and, more particularly, to a system and method for protecting optical light-trails in an optical communication network.

BACKGROUND

Telecommunication systems, cable television systems, and data communication networks use optical networks to rapidly convey large amounts of information between remote points. In an optical network, information is conveyed in the form of optical signals through optical fibers. Optical fibers comprise thin strands of glass capable of transmitting optical signals over long distances with very low loss of signal strength.

Recent years have seen an explosion in the use of telecommunication services. As the demand for telecommunication services continues to grow, dependence on optical networks also increases. Failures of an optical path may be addressed by protection techniques. For example, a protection optical path may be created to carry the traffic. Thus, providing protection optical paths has become an important goal in protecting optical networks.

SUMMARY

A system and method for protecting optical light-trails in an optical communication network are provided. According to one embodiment, providing protection for a network includes establishing a light-trail through a sequence of nodes of an optical network, where the sequence of nodes is coupled by a first fiber and by a second fiber. Traffic is communicated through a plurality of connections of the light-trail, where a connection is operable to communicate traffic from a source node of the sequence of nodes to one or more destination nodes of the sequence of nodes. A failure of the light-trail is detected. A protection light-trail corresponding to the light-trail is established. The traffic of the plurality of connections is communicated through the protection light-trail.

Technical advantages of certain embodiments of the present invention may include effective techniques for addressing failures in optical networks. More specifically, in particular embodiments of the present invention, a light-trail may support multiple connections carrying traffic. If the light-trail fails, a protection light-trail may be created. The protection light-trail may carry the traffic of the multiple connections. The use of such protection light-trails may result in more effective protection of the optical network since the protection light-trail can carry the traffic of the multiple connections.

It will be understood that the various embodiments of the present invention may include some, all, or none of the enumerated technical advantages. In addition, other technical advantages of the present invention may be readily apparent to one skilled in the art from the figures, description, and claims included herein.

DETAILED DESCRIPTION OF THE DRAWINGS

Figure 1A:
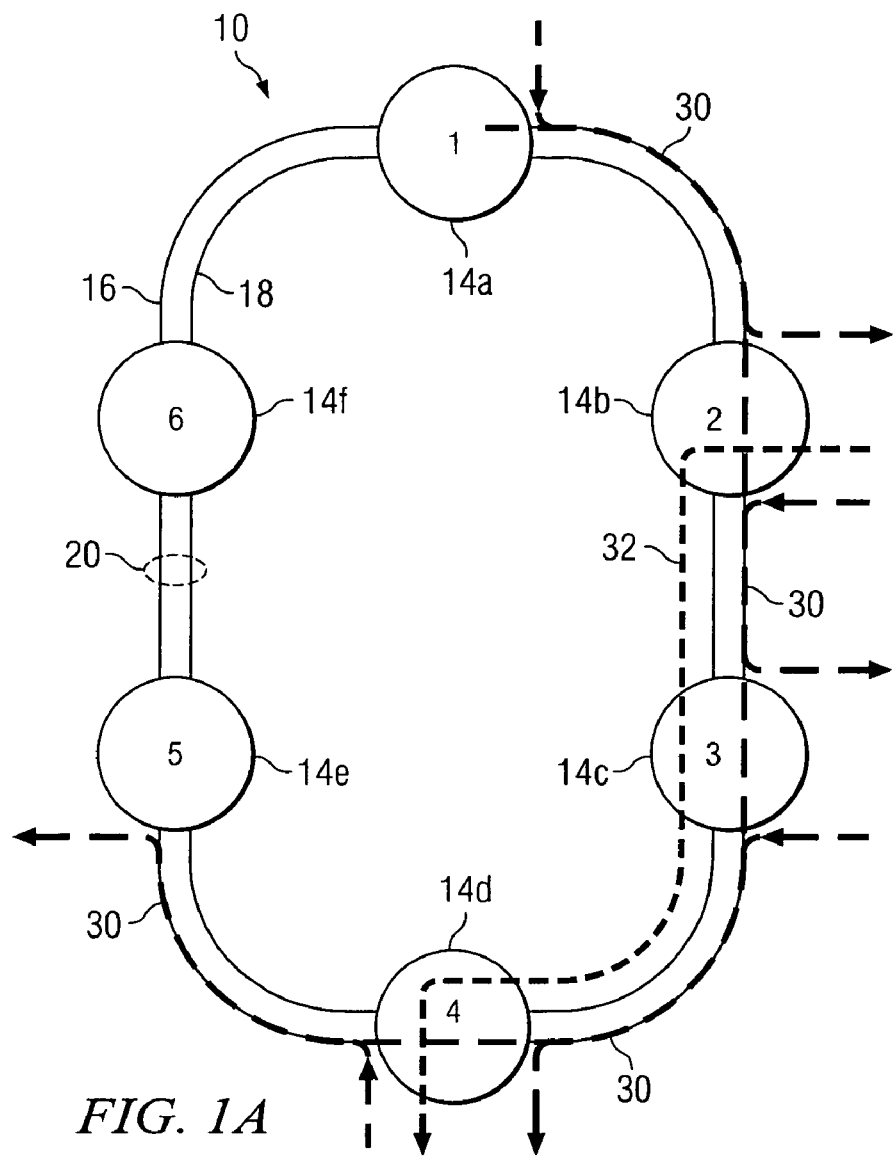
FIGS. 1A through 1C illustrate an optical network for which a protection light-trail may be established.
Figure 1B:
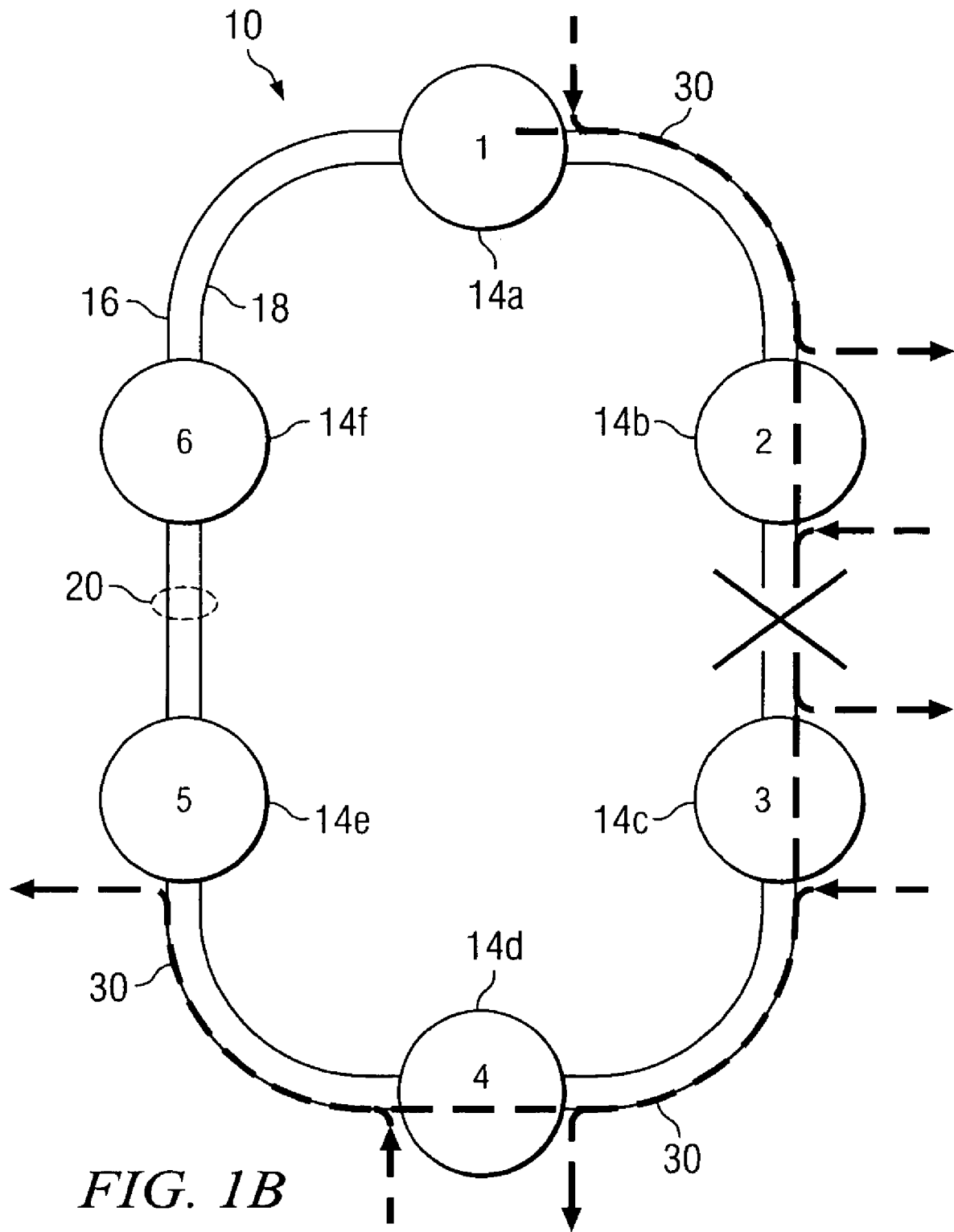
Figure 1C:
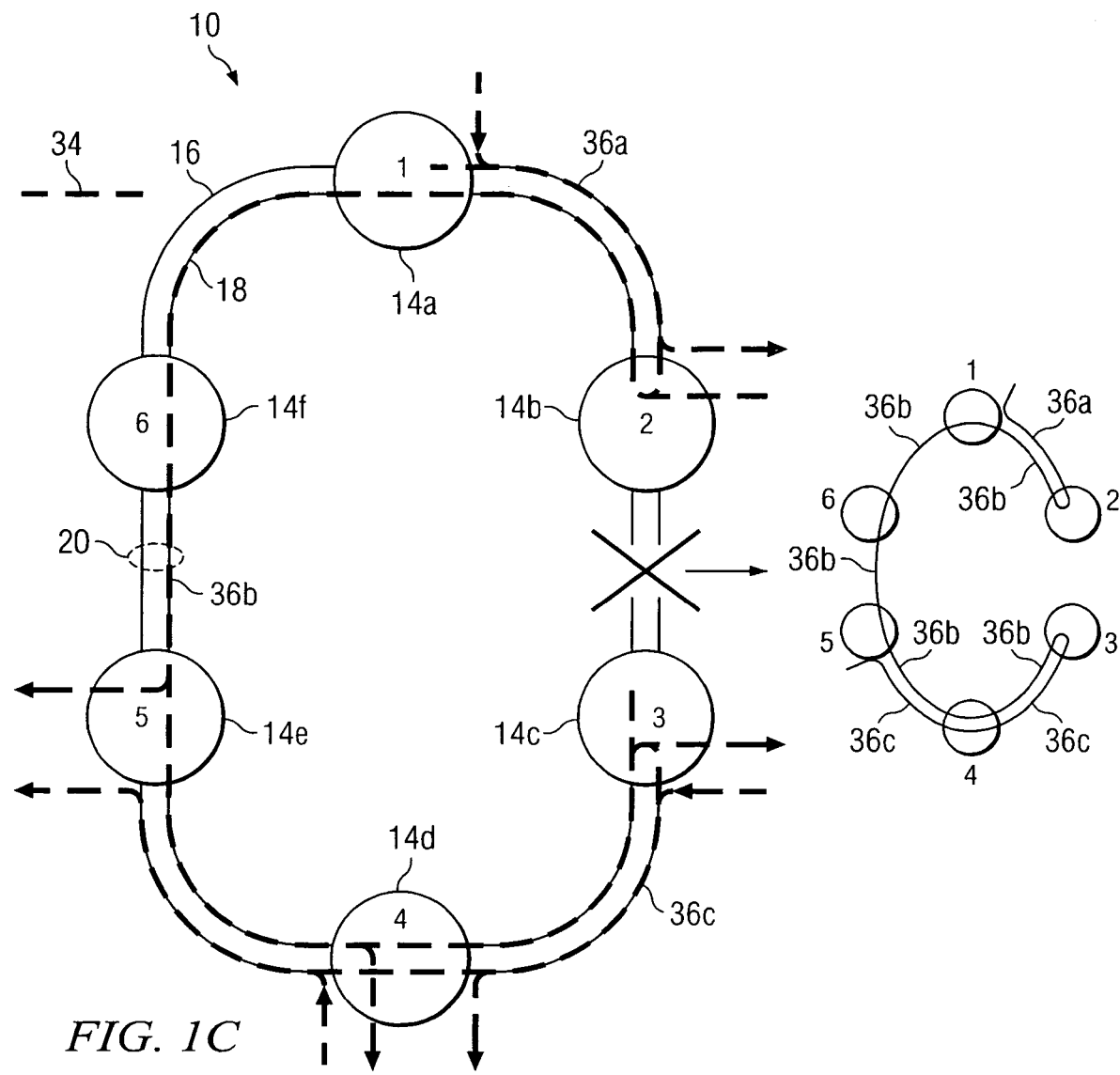

FIGS. 1A through 1C illustrate an optical network 10 for which a protection light-trail may be established. Optical network 10 includes a plurality of nodes 14 coupled to an optical ring 20. During operation, nodes 14 transmit and receive traffic on optical ring 20 on one of a plurality of wavelengths. Nodes 14 may transmit optical traffic over a light-trail, such as work light-trail 30, to other nodes 14 of the light-trail through a plurality of connections, such as connection 32. In the event of a failure of a span between nodes 14, a protection light-trail, such as protection light-trail 34, may be established to re-route traffic transmitted over the plurality of connections.

FIG. 1A illustrates optical network 10. According to the illustrated embodiment, network 10 comprises an optical network in which a number of optical channels are carried over a common transmission media at different wavelengths. For example, network 10 may be a wavelength division multiplexed (WDM) network, a dense wavelength division multiplexed (DWDM) network, other suitable multi-channel network, or any suitable combination of the preceding. Network 10 may represent all or a portion of a short-haul metropolitan network, a long-haul intercity network, other suitable network, or any suitable combination of the preceding. Network 10 may include, as appropriate, a single uni-directional fiber, a single bi-directional fiber, or a plurality of uni- or bi-directional fibers. Although FIG. 1 illustrates a particular embodiment and configuration of ring network 10, network 10 may include any appropriate number of nodes 14 configured in any appropriate manner. For example, mesh, linear, or other suitable types of optical networks may be used in accordance with the present invention.

According to the illustrated embodiment, network 10 includes optical ring 20. Optical ring 20 comprises a pair of uni-directional fibers, first fiber 16 and second fiber 18, that optically couples the plurality of n nodes 14a-14f, labeled 1, 2, . . . , 6. First fiber 16 transports traffic in a clockwise direction, and second fiber 18 transports traffic in a counter-clockwise direction. A fiber may refer to any suitable fiber operable to transmit a signal, such as an optical fiber. A sequence of k nodes 14, k<n, through which traffic may be transported in a clockwise direction may be expressed as (1, 2, . . . , k)$_{CW}$, and a sequence of k nodes 14 through which traffic may be transported in a counterclockwise direction (1, n, n–1, . . . , k)$_{CCW}$.

Optical traffic propagates between nodes 14. As used herein, "traffic" of a network refers to information transmitted, stored, or sorted in the network. Such traffic may comprise optical signals having at least one characteristic modulated to encode real-time or non-real-time, audio, video, textual, multimedia, other suitable data, or any suitable combination of the preceding. Modulation may be based on phase shift keying (PSK), intensity modulation (IM), or other suitable methodologies. Additionally, the information carried by traffic may be structured in any suitable manner. Although the description below focuses on an embodiment of network 10 that communicates traffic on optical ring 20 in the form of optical frames, network 10 may be configured to communicate traffic structured in the form of frames, packets, or other appropriate manner.

Nodes 14 may be configured to establish work light-trail 30 and transmit or receive some or all optical traffic on work light-trail 30. A light-trail may refer to an optical path of a portion of fiber coupling any two or more nodes of an optical network. The first node of the light-trail may be referred to as a "convener node," and the last node may be referred to as an "end node." Nodes of a light-trail share the light-trail, as appropriate, to transmit information to other nodes of the light-trail on a wavelength associated with the light-trail. Accordingly, a light-trail may be regarded as a generalization of an optical wavelength circuit, or a light path. Light-trails address the inefficiencies associated with assigning a wavelength for traffic communicated from a single node to another node. In addition, light-trail communications allow for optical multicasting and dynamic provisioning.

A light-trail may be represented by a sequence of nodes that establish the light-trail. For example, a light-trail with k nodes 14 may be expressed as $(1, 2, \ldots, k)_{CW}$. In the illustrated embodiment, the sequence of nodes 14 labeled 1 through 5 in a clockwise manner establish work light-trail 30, so work light-trail 30 may be represented by $(1, 2, \ldots, 5)_{CW}$.

A light-trail 30 may have a plurality of connections 32. A connection may refer to a path that includes a source node 14, one or more destination nodes 14, and none, one, or more intervening nodes 14. A source node 14 transmits traffic through the intervening nodes 14, if any, to one or more destination nodes 14 through connection 32. Typically, one source node 14 transmits traffic at a time. The intervening nodes 14, if any, may listen to connection 32, but typically only the one or more designated destination nodes 14 may tap the traffic of connection 32. Optical multicasting may be provided by designating multiple nodes as destination nodes.

A light-trail with k nodes 14 may have a number of source-destination pairs given by a combination of k taken two at a time, expressed as $$\binom{N(1, \ldots, k)_{CW}}{2},$$

where $N(1, \ldots, k)_{CW}$ represents a number of nodes in the sequence $(1, \ldots, k)_{CW}$. Accordingly, a light-trail with k nodes 14 may support $$\binom{N(1, \ldots, k)_{CW}}{2}$$

connections between source-destination pairs. For example, work light-trail 30 with five nodes 14 may have a maximum of ten connections 32 between source-destination pairs.

Nodes 14 may have specific characteristics that enable the nodes 14 to implement light-trails. As an example, these characteristics include a drop and continue function, where traffic received by an element of the node is both dropped and forwarded to allow the traffic to continue along the light-trail. As another example, a node may passively add traffic without using optical switches that use power, electricity, or moving parts. As yet another example, an out-of-band control channel may be used, instead of an in-band control channel communicated with the data.

Nodes 14 use light-trails 30 to facilitate communication between a plurality of client devices (not shown) coupled to nodes 14 through a plurality of client ports. Client devices may include personal computers (PCs), telephones, fax machines, hard drives, web servers, other appropriate communication device, or any suitable combination of the preceding. A node 14 may generate optical traffic at one or more wavelengths based on electrical signals received from client devices coupled to the node 14, and may add the traffic to the optical traffic propagating on optical ring 20. Traffic may be added passively without using optical switches that use power, electricity, or moving parts.

A node 14 may also receive traffic from optical ring 20 and drop traffic destined for client devices of the node 14. Node 14 may drop traffic by transmitting a copy of the traffic to any appropriate components that are a part of or coupled to the node 14, while also allowing the traffic to continue to downstream nodes 14. A node 14 drops and electrically converts traffic received at particular wavelengths for which the node 14 is configured to receive traffic and either does not drop or discards traffic received at other wavelengths.

Nodes 14 may exchange control messages to initiate, manage, and terminate light-trails. The control messages may be communicated using an optical supervisory channel (OSC) or other out-of-band control channel on which control signals may be exchanged among components of optical network 10. In a particular embodiment, the OSC represents one or more wavelengths that may be dedicated to control signals. Alternatively, the OSC may represent a separate fiber of optical ring 20 that may be dedicated to control signals. According to particular embodiments, control signals associated with a particular light-trail may be transmitted on the OSC in the direction of traffic of the light-trail, in a direction opposite to the direction of traffic of the light-trail, or in both directions.

Multiple light-trails 30 may be established on one or more wavelengths utilized by optical network 10, and multiple non-overlapping light-trails 30 may exist at a particular time on a common wavelength. There are two levels of arbitration associated with light-trails. At the first level, light-trails may be established, terminated, or dimensioned (that is, lengthened or shortened) to meet particular demands. At the second level, the use of the light-trail is allocated to nodes of the light-trail. Nodes may be allocated bandwidth according to any suitable allocation technique. For example, bandwidth may be allocated according to predefined rules, heuristics, bandwidth allocation algorithms, round robin techniques, auction techniques, node priorities, or dynamic techniques.

According to one embodiment of the invention, if a fiber of a work light-trail 30 cannot transmit traffic, a protection light-trail may be provided for some or all of the connections of work light-trail 30. For example, a fiber may be unable to transmit traffic if there is a fiber-cut. According to the embodiment, a protection light-trail may be established to provide an alternate route for the connections. The protection light-trail may use remnants of the failed light-trail such that optical switching may be minimized when moving from the failed light-trail to the protection light-trail.

Modifications, additions, or omissions may be made to optical network 10 without departing from the scope of the invention. The components of optical network 10 may be integrated or separated according to particular needs. Moreover, the operations of optical network 10 may be performed by more, fewer, or other components. Additionally, operations of optical network 10 may be performed using any suitable logic comprising software, hardware, other logic, or any suitable combination of the preceding.

FIG. 1B illustrates a failure of a span of optical network 10. A span may refer to a portion of one or more fibers between nodes. Span i may represent a span between node i and node i+1. A span may have a failure if the span is not operable to transmit traffic. According to one embodiment, a span may have a failure if at least one fiber is not operable to transmit traffic. For example, a span may have a failure if one or more fibers of the span has a fiber cut. A span $i_f$ may represent a failed span having a failure. According to the illustrated embodiment, span 2 between nodes 2 and 3 is a failed span.

FIG. 1C illustrates the creation of a protection light-trail 34 in response to the failure of the span. When the failure is detected, protection light-trail 34 is established to transmit traffic carried by the connections 32 of work light-trail 30. Protection light-trail 34 includes remnants of the original work light-trail 30 as well as a wrap-around light-trail.

According to the illustrated embodiment, protection light-trail 34 includes segments 36. Segments 36 may include remnant segments 36a and 36c and wrap-around segment 36b. A remnant segment may refer to a remnant of the original light-trail of the failed span that is still operable to transmit traffic. An upstream remnant segment may refer to a remnant segment upstream of the failed span, and a downstream remnant segment may refer to a remnant segment downstream from the failed span. A wrap-around segment may refer to a loop-back path with respect to the failed span that is created for the protection light-trail. According to the illustrated embodiment, remnant segment 36a comprises segment $(1, \ldots, i_f)_{CW}$, and remnant segment 36c includes segment $(i_f+1, \ldots, k)_{CW}$. Wrap-around segment 36b, which may be denoted as $P_{(1, \ldots, k)_{CW}}$, comprises a new segment $(i_f, \ldots, i_f+1)_{CCW}$.

Protection light-trail 34 may transmit traffic from $$\binom{N(1, \ldots, k)_{CW}}{2}$$

connections 32 of light-trail 30. Connections 32 with source nodes 14 in remnant segment 36a and destination nodes 14 in remnant segment 36c may be routed through wrap-around segment 36b. Connections 32 with source nodes 14 in remnant segment 36a and destination nodes 14 in remnant segment 36a may be routed through remnant segment 36a. Similarly, connections 32 with source nodes 14 in remnant segment 36c and destination nodes 14 in remnant 36c may be routed through remnant segment 36c.

Modifications, additions, or omissions may be made to the method for establishing protection light-trail 34 without departing from the scope of the invention. The method may include more, fewer, or other steps. Additionally, steps may be performed in any suitable order without departing from the scope of the invention.

Figure 2:
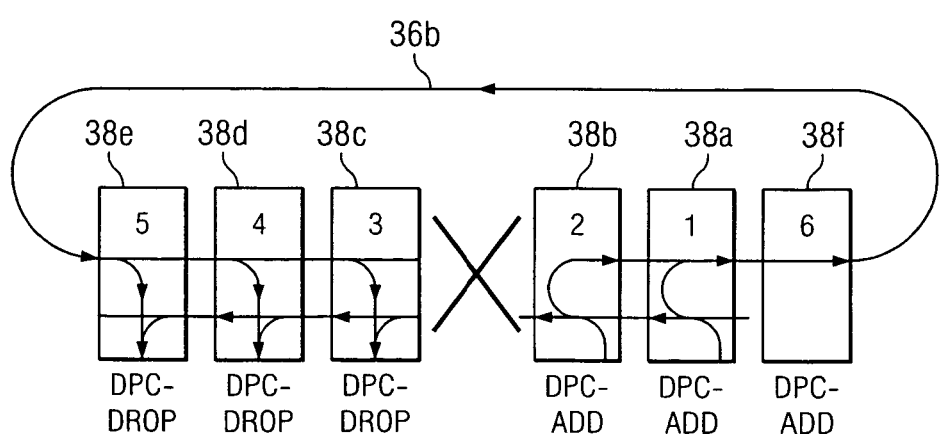
FIG. 2 is a block diagram illustrating one embodiment of protection switches that may be used to route traffic along the protection light-trail of FIG. 1C.

FIG. 2 is a block diagram illustrating one embodiment of protection switches 38 that may be used to route traffic along protection light-trail 34 of FIG. 1C. According to the illustrated embodiment, a protection switch 38x is located at node 14x, where x=a, b, . . . , f, labeled nodes 1, 2, . . . , 6, respectively. Upstream-to-failure nodes 14 may refer to nodes 14 upstream of the failed span, and downstream-from-failure nodes 14 may refer to nodes 14 downstream of the failed span. According to the illustrated embodiment, nodes 14b,a, labeled 2, 1, respectively, are upstream-to-failure nodes 14, and nodes 14e,d,c, labeled 5, 4, 3, respectively, are downstream-from-failure nodes 14.

A protection switch 38 may be in any of a number of suitable states. For example, a protection switch 38 may be in a work port coupled (WPC) state, a protection port coupled (PPC) state, a dual port coupled (DPC) state, other suitable state, or any combination of the preceding. In the work port coupled state at the transmit side, substantially all transmit traffic is provided to a work light-trail. At the receive side, substantially all receive traffic is received from a work light-trail. In the protection port coupled state at the transmit side, substantially all transmit traffic is provided to a protection light-trail. At the receiver, substantially all receive traffic is received from a protection light-trail.

In the dual port coupled state, the incoming or outgoing traffic is simultaneously combined with or split from or to the work light-trail and the protection light-trail. At the transmit side, the traffic is split to yield two copies. One copy is provided to the work light-trail, and the other copy is provided to the protection light-trail. The transmit side dual port coupled state may be referred to as the DPC-add mode. At the receive side, traffic received from either the work light-trail or the protection light-trail is combined and provided to the node. The receive side dual port coupled state may be referred to as the DPC-drop mode.

In response to a span failure at span $i^f$, upstream-to-failure nodes 1, . . . , i upstream of failed span $i_f$ configure their protection switches 38 to the DPC-add mode at the transmit side. Protection switches 38 provides copies of the traffic to wrap-around segment 36b and remnant segment 36a. Accordingly, the upstream-to-failure nodes may communicate to downstream-from-failure nodes through wrap-around segment 36b.

Downstream-from-failure nodes i+1, . . . , k downstream of failed span $i_f$ configure their protection switches 38 to the DPC-drop mode at the receive side. Protection switches 38 combine traffic received from either the work light-trail or the protection light-trail. Accordingly, downstream-from-failure nodes may tap traffic from the nodes of upstream remnant segment 36a received via wrap-around segment 36b and downstream remnant segment 36c.

Figure 3A:
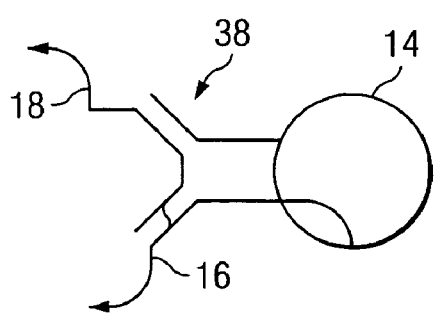
FIGS. 3A and 3B are diagrams illustrating an example protection switch in DPC-add and DPC-drop modes.
Figure 3B:
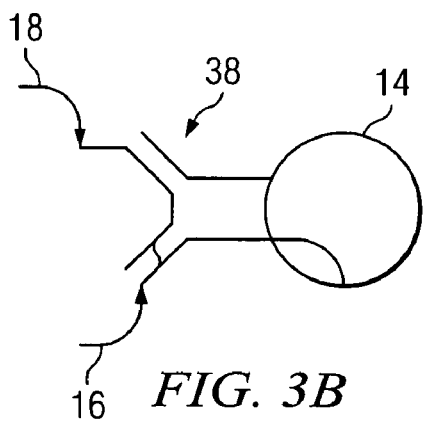

FIGS. 3A and 3B are diagrams illustrating an example protection switch 38 in DPC-add and DPC-drop modes. According to the illustrated embodiment, protection switch 38 is coupled to clockwise fiber 16, counterclockwise fiber 18, and node 14. Protection switch 38 may comprise any suitable optical switch. For example, protection switch 38 may comprise a three-port Mach Zehneder interferometer (MCI)-based switch. The switch may have one input/output port coupled to two input/output ports, that is, the switch may be a 1×2 switch. The switching between the three ports may occur with a variable power ratio.

FIG. 3A illustrates example protection switch 38 in the DPC-add mode. In this mode, protection switch 38 provides copies of the traffic to clockwise fiber 16 and counterclockwise fiber 18. FIGURE B illustrates example protection switch 38 in the DPC-drop mode. In this mode, protection switch 38 combines traffic received from clockwise fiber 16 or counterclockwise fiber 18.

Figure 4:
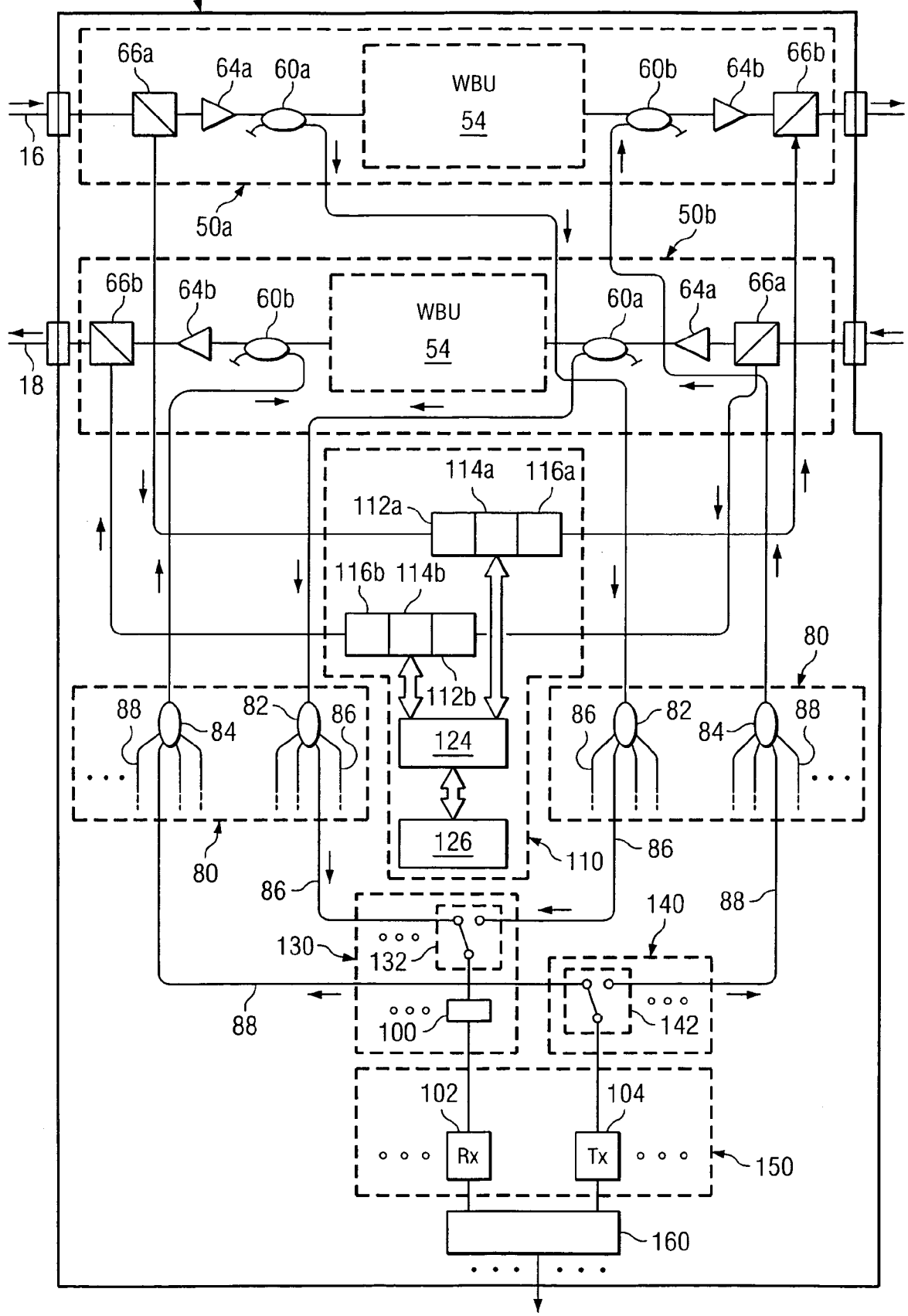
FIG. 4 is a block diagram illustrating a particular embodiment of a node that may be utilized in an optical network to establish a protection light-trail.

FIG. 4 is a block diagram illustrating a particular embodiment of a node that may be utilized in an optical network to establish a protection light-trail. As an example, the node may be used as a node 14 of the example ring network 10 of FIG. 1 or may used as a node in any other type of network to establish a protection light-trail.

According to the illustrated embodiment, node 48 includes transport elements 50a and 50b, distributing/combining elements 80a and 80b, a managing element 110, a drop element 130, an add element 140, a burstponder 150, and a switching element 160. Transport elements 50 add traffic to and drop traffic from fibers 16 and 18. More specifically, transport elements 50 may generate one or more copies of optical signals propagating on fibers 16 and 18 in order to communicate particular portions of the traffic carried in the optical signals among other nodes and devices coupled to node 48.

Transport elements 50 may include components appropriate to add traffic to fibers 16 and 18. The traffic may be generated by node 48 or received by transport elements 50 from client devices of node 48. As an example, a transport element 50 may include a coupler 60b that adds traffic received from add element 140 to traffic propagating on the associated fiber. Transport elements 50 may also include components appropriate to drop traffic from fibers 16 and 18. As an example, a transport element 50 may include a coupler 60a that splits traffic into two copies and forwards one copy of the traffic to drop element 130 and the other copy to a relevant fiber. Although two couplers 60a and 60b are illustrated for each transport element 50, particular embodiments may include a single coupler that both adds and drops traffic. Such a single coupler may be used, for example, in particular embodiments that do not include a wavelength blocking unit 54.

According to the illustrated embodiment, a transport element 50 may include a wavelength blocking unit (WBU) 54 configured to terminate particular wavelengths of traffic propagating on fibers 16 and 18. As a result, traffic that has already been received by its intended destination or destinations may be terminated at a subsequent node 48. WBU 54 may comprise one or more suitable components configured in any appropriate manner to provide the functionality of dynamically blocking certain wavelengths and passing other wavelengths. As an example, WBU 54 may represent a wavelength-selective switch (WSS) operable to output any particular wavelength or set of wavelengths received at WBU 54.

As another example, WBU 54 may represent a structure that includes an optical demultiplexer and an optical multiplexer coupled by a series of switches. In such an embodiment, the demultiplexer may demultiplex the signal into its constituent channels. The switches may then be dynamically configured to selectively terminate or forward each channel to the multiplexer based on control signals received by each switch. The channels are received by the multiplexer, multiplexed into a WDM optical signal, and forwarded to downstream elements.

As another example, WBU 54 may represent a collection of tunable filters tuned to allow only traffic on appropriate wavelengths to be forwarded on fibers 16 or 18. In such an embodiment, a coupler of WBU 54 may receive optical signals input to WBU 54 and split the optical signals into a plurality of copies, transmitting each of these copies to a particular tunable filter. Each tunable filter may then selectively pass traffic propagating at a particular wavelength or within a particular range of wavelengths and block traffic propagating at the other wavelengths. Each tunable filter then forwards the passed traffic propagating at the associated wavelength or wavelengths to an output coupler of WBU 54. The output coupler then combines the output of the various tunable filters to produce an output WDM optical signal and forwards the output optical signal to components downstream from WBU 54.

Transport elements 50 may include appropriate components to allow node 48 to transmit and receive information pertaining to the status and operation of fibers 16 and 18, other nodes, any light-trails established in network 10, or any other appropriate elements or functionality of optical network 10. In particular, each node 48 may include elements to allow node 48 to receive and transmit messages on an optical supervisory channel (OSC). In the illustrated embodiment, each transport element 50 includes an OSC ingress filter 66a that processes an ingress optical signal from its respective fiber 16 or 18. OSC filter 66a filters the OSC signal from the optical signal and forwards the OSC signal to a respective OSC receiver 112. OSC filter 66a also forwards the remaining optical signal to other components of transport element 50.

Each transport element 50 also includes an OSC egress filter 66b that adds an OSC signal from an associated OSC transmitter 116 to the optical signal propagating on the associated fiber 16 or 18 and forwards the combined signal to elements located downstream on fiber 16 or 18. The added OSC signal may be locally-generated data or may be OSC data received by node 48 and passed through managing element 110. Transport elements 50 may include amplifiers 64 that amplify the signal and forwards the signal to an associated coupler 60a. Amplifiers 64 may be omitted, depending on the circumstances.

Distributing/combining elements 80 may each comprise a drop signal splitter 82 and an add signal combiner 84. A splitter 82 may represent any appropriate component or collection of components capable of splitting a received optical signal into a plurality of copies, each to be propagated on a particular drop lead 86. In particular embodiments, a splitter 82 may comprise a coupler connected to one optical fiber ingress lead and a plurality of optical fiber egress leads, which serve as drop leads 86. For example, if a splitter 82 is coupled to four drop leads 86, splitter 82 may each specifically comprise a 2×4 optical coupler, where one ingress lead is terminated, the other ingress lead is coupled to a coupler 60 via a fiber segment, and the four egress leads are used as drop leads 86. A drop lead 86 may be connected to a drop element 130 associated with a particular local port of node 48. Although the illustrated embodiment shows a splitter 82 coupled to one drop lead 86, splitter 82 may be coupled to any appropriate number of drop leads 86.

A combiner 84 may represent any appropriate component or collection of components capable of combining a plurality of optical signal into a single output signal. In particular embodiments, a combiner 84 may comprise a coupler with multiple optical fiber ingress leads, which serve as add leads 88, and one optical fiber egress lead. For example, if combiner 84 is coupled to four ingress leads, combiner 84 may comprise a 2×4 optical coupler, where one egress lead is terminated, the other egress lead is coupled to a coupler via a fiber segment, and the four ingress leads comprise add leads 88. An add lead 88 may be connected to an add element 140 associated with a particular port of node 48. Although the illustrated embodiment shows a combiner 84 coupled to one add lead 88, combiner 84 may be coupled to any appropriate number of add leads 88.

Drop elements 130 selectively couple ports of burstponder 150 to outputs of distributing/combining elements 80 through filters 100, which are each capable of isolating traffic in a different wavelength from each copy of the optical signal created by splitter 82. As a result, drop elements 130 may output particular wavelengths of traffic from fibers 16 and 18 to particular ports of burstponder 150. Add elements 140 also couple particular ports of burstponder 150 to combining/distributing elements 80.

Drop element 130 and add element 140 may include, respectively, a drop switch 132 and an add switch 142, or other suitable components, to selectively couple associated ports of burstponder 150 to fiber 16 or 18. In a particular embodiment, a drop switch 132 may allow drop element 130 to selectively couple a drop signal from either fiber 16 or fiber 18 to a filter 100 included in the drop element 130. Filter 100 may be tuned to a particular wavelength such that traffic propagating at a particular wavelength on the selected fiber is output to burstponder 150.

Alternatively, add switch 142 may be replaced by a coupler and a shutter for each branch of the split signal. The coupler may split a signal from the associated transmitter 104, and the shutters may control whether the signal is added to fiber 16, fiber 18, or both fibers 16 and 18. As a result, drop element 130 and add element 140 may be utilized to support protection switching for node 48. Alternatively, particular embodiments of drop element 130 and add element 140 may omit drop switch 132 and add switch 142, respectively, and couple different ports of burstponder 150 to each fiber 16 and 18. Moreover, in particular embodiments, node 48 may include multiple drop elements 130, add elements 140, or both, where each element is associated with a particular wavelength supported by optical network 10.

Burstponder 150 converts bursty or time-interleaved optical traffic received from drop elements 130 to seamless and continuous electrical traffic for delivery to client devices of node 48. Burstponder 150 also converts electrical traffic received from client devices to optical traffic for transmission on fiber 16 or 18 in bursts when the node 48 has use of the light-trail. That is, burstponder 150 allows node 48 to time share a light-trail while creating an impression to client devices of the node 48 that the wavelength is available on a seamless and continuous basis.

Burstponder 150 may include any appropriate number of receivers 102 and transmitters 104. Receivers 102 are operable to receive optical signals and generate electrical signals based on these optical signals. The output of receivers 102 may be stored in one or more buffers (not shown) to be transmitted to switching element 160 at an appropriate time.

Transmitters 104 are operable to receive electrical signals and to generate a burst of optical signals based on these electrical signals. Certain ports of burstponder 150 may pass electrical traffic to a particular transmitter 104 associated with that port. A transmitter 104 may generate a burst of optical traffic from the electrical traffic and transmit the optical traffic to a particular add element 140 associated with the transmitter 104. Transmitters 104 may be tuned to generate optical traffic at a particular wavelength, or may transmit at a fixed wavelength. Additionally, burstponder 150 may include one or more buffers that store electrical traffic from switching element 160 to be input to transmitter 104 at an appropriate time, such as when the node is granted use of a light-trail. Buffering may be useful because a node 48 may not be able to transmit traffic when it is received because another node 48 is using a shared light-trail.

Switching element 160 may represent any appropriate component or components operable to transmit electrical traffic output by burstponder 150 to appropriate client devices of node 48 and to transmit electrical traffic received from client devices of node 48 to appropriate ports of burstponder 150. The electrical traffic may include information in the form of packets, frames, datagrams, other information structured in any other appropriate form, or any combination of the preceding. In a particular embodiment, switching element 160 comprises a Layer-2 (L2) switch. In such an embodiment, the L2 switch may switch each packet, based on a header included in that packet, to deliver the packet to a port of the L2 switch coupled to an appropriate port of burstponder 150. Although switching element 160 is shown as part of node 48 in FIG. 2A, switching element 160 may be physically separate from node 48.

Managing element 110 may comprise OSC receivers 112, OSC interfaces 114, OSC transmitters 116, and an element management system (EMS) 124. Each OSC receiver 112, OSC interface 114, and OSC transmitter 116 set forms an OSC unit for one of the fibers 16 or 18 of node 48. The OSC units receive and transmit OSC signals for the EMS 124. EMS 124 may be communicably coupled to a network management system (NMS) 126.

A management system may refer to EMS 124, NMS 126, or both. A management system may comprise logic encoded in media for performing network or node or both network and node monitoring, failure detection, protection switching and loop back or localized testing functionality of the optical network 10. Logic may refer to software, instructions encoded in hardware, or a combination of both. Software may be encoded in a disk or other computer-readable medium, such as memory. Instructions may be encoded in an application-specific integrated circuit (ASIC), field programmable gate array (FPGA), or other processor or hardware.

In a particular embodiment, a management system may generate, transmit, receive, process, or perform any suitable combination of the preceding to control messages associated with the establishment, operation, and termination of light-trails. It will be understood that functionality of a management system may be performed by other components of the network or may be otherwise distributed or centralized. For example, operation of NMS 126 may be distributed to the EMS 124 of nodes 48, and the NMS 126 may thus be omitted as a separate, discrete element. Similarly, the OSC units may communicate directly with NMS 126, and EMS 124 may be omitted.

EMS 124 monitors or controls or both monitor and control elements within node 48. For example, EMS 124 may control operation of transmitters 104, receivers 102, and VVBU 54 to facilitate the establishment and use of light-trails. To control elements, EMS 124 may process control messages transmitted by other nodes 48 or other components of optical network 10 and adjust operation of node 48 in response to the control messages. In the illustrated embodiment, EMS 124 receives an OSC signal from each of fiber 16 and 18 in an electrical format via an OSC receiver 112 and OSC filter 66a. The OSC signal may include one or more of multiple types of control messages. EMS 124 may process the signal, forward the signal, loop-back the signal, or perform any suitable combination of the preceding. EMS 124 may be operable to resend the OSC signal via OSC transmitter 116 and OSC filter 66b to the next node on fiber 16 or 18, adding locally-generated control messages or other suitable information to the OSC, if appropriate.

In a particular embodiment of node 48, EMS 124 may control operation of WBU 54 to establish a light-trail on a specified wavelength on a particular fiber 16 or 18 in response to a setup message received from a convener node 48a. In particular, if node 48 represents an intermediate node of the requested light-trail, EMS 124 may configure WBU 54 to allow optical signals propagating at the specified wavelength on the relevant fiber to pass through WBU 54. If node 48 represents a node 48 at the beginning or end of a light-trail, EMS 124 may configure WBU 54 to block optical signals propagating at the specified wavelength on the relevant fiber.

Furthermore, EMS 124 may also generate control messages for transmission to other nodes 48 or other components of optical network 10. For example, EMS 124 may generate electronic signals associated with setup messages, intimation messages, request messages, any other appropriate type of control messages, or any combination of the preceding, and communicate the electronic signals to OSC transmitter 116. OSC transmitter 116 may transmit optical signals representing the appropriate control message to the associated transport element 50. The control messages may then be added to the optical traffic on fiber 16 or 18, as appropriate.

NMS 126 may represent a portion or all of EMSs 124 of nodes 48 of optical network 10. NMS 126 collects information from nodes 48 of optical network 10 and is operable to process control messages transmitted by nodes 48 to manage particular aspects of the use of light-trails. For example, in a particular embodiment, NMS 126 may be operable to select a particular node 48 for transmission on a light-trail when multiple nodes 48 request use of the light-trail.

The descriptions of NMS 126 and EMSs describes particular embodiments in which functionality is divided between NMS 126 and EMSs 124 in a particular manner. In alternative embodiments, the described functionality may be distributed between NMS 126 and EMSs 124 in any appropriate manner. Additionally, although NMS 126 and EMS 124, as shown in FIG. 4, represent, at least in part, components located within node 48, some or all of NMS 126, EMS 124, or both may be located in a different node or external to nodes 48.

Although not shown in FIG. 4, node 48 may include a memory operable to store code associated with EMS 124, NMS 126, other components of optical network 10, or any combination of the preceding, information specifying a wavelength assignment scheme utilized for protection traffic on optical network 10, any other suitable information used during operation of optical network 10, or any combination of the preceding. Memory may represent one or more memory devices that are located within node 48 or that are physically separate from node 48. Additionally, memory may be shared with other components of optical network 10 including other nodes 48. Memory may represent computer disks, a hard disk memory, random access memory (RAM), read-only memory (ROM), or any other suitable storage media.

In operation, transport elements 50 receive traffic from fibers 16 and 18. The traffic received from fibers 16 and 18 may comprise an optical signal that includes an OSC signal. OSC ingress filter 66a of transport element 50 filters the OSC signal from the optical signal and forwards the OSC signal to its respective OSC receiver 112. EMS 124 processes control messages of the OSC signal and adjusts operation of node 48 in response to the control messages. OSC ingress filter 66a forwards the remaining transport optical signal to the associated amplifier 64. Amplifier 64 amplifies the signal and forwards the signal to an associated coupler 60a. Coupler 60a splits the signal from the amplifier 64 into two copies: a through signal that is forwarded to WBU 54 and a drop signal that is forwarded to distributing/combining element 80. WBU 54 selectively terminates or forwards channels of the through signal.

Distributing/combining element 80 splits the drop signal into one or more copies and forward the copies of the drop signal to one or more drop elements 130. Burstponder 150 receives the output of drop elements 130. A receiver 102 of burstponder 150 converts the signal received from an associated drop element 130 into continuous electrical traffic. The electrical traffic generated by each receiver 102 is then output to switching element 160. Switching element 160 switches the traffic in any appropriate manner to facilitate transmission of the traffic to an appropriate client device of node 48.

Switching element 160 also receives seamless and continuous electrical traffic from client devices coupled to switching element 160 and switches this electrical traffic to communicate the electrical traffic to appropriate ports of burstponder 150. Transmitters 104 of burstponder 150 generate optical signals based on the electrical signals, and send the optical signals to associated add elements 140. Add switch 142 of add element 140 selectively couples the add element 140 to a combiner 84 of distributing/combining element 80 associated with either fiber 16 or 18. Distributing/combining element 80 forwards the optical signals to the coupler 60b of the associated fiber.

Coupler 60b may combine the output of the associated WBU 54 with the traffic received from an associated combiner 84, and forward the combined signal to through amplifier 64 to OSC egress filter 66b. OSC egress filter 66b adds an OSC signal from the associated OSC transmitter 116 to the combined optical signal and forwards the new combined signal as an egress transport signal to the associated fiber 16 or 18 of optical network 10.

Although the present invention has been described with several embodiments, various changes and modifications may be suggested to one skilled in the art. It is intended that the present invention encompass such changes and modifications as fall within the scope of the appended claims.

What is claimed is:

1. A method for providing protection for a network, comprising:
    establishing a light-trail through a sequence of nodes of an optical network, the sequence of nodes coupled by a first fiber and by a second fiber, the first fiber comprising a first optical fiber, the second fiber comprising a second optical fiber, each fiber passing through a transport element of each node, each node of the light-trail comprising a wavelength blocking unit;
    configuring the wavelength blocking units of a beginning node of the light-trail and an end node of the light-trail to block a plurality of optical signals of a common wavelength;
    configuring the wavelength blocking units of a plurality of intermediate nodes of the light-trail to allow the plurality of optical signals of the common wavelength;
    communicating traffic through a plurality of connections of the light-trail, the traffic comprising the plurality of optical signals of the common wavelength, a connection operable to communicate traffic from a source node of the sequence of nodes, through one or more intervening nodes of the sequence of nodes, to one or more destination nodes of the sequence of nodes using the common wavelength;
    detecting that the light-trail has a failure;
    establishing a protection light-trail corresponding to the light-trail, the protection light-trail configured to communicate the traffic comprising the plurality of optical signals of the common wavelength, the establishing the protection light-trail corresponding to the light-trail further comprising:
        determining a failed span comprising the failure, the first fiber comprising an upstream remnant segment and a downstream remnant segment, the upstream remnant upstream from the failure, the downstream remnant downstream from the failure;
        creating a wrap-around segment from a portion of the second fiber, the wrap- around segment comprising a loop-back path of the failed span; and
        establishing the protection light-trail from the upstream remnant segment, the wrap-around segment, and the downstream remnant segment; and
    communicating the traffic of the plurality of connections through the protection light-trail.

2. The method of claim 1, wherein:
    the sequence of nodes comprises a first number k of nodes; and
    the plurality of connections comprises a second number of connections, the second number equivalent to a combination of the first number k taken two at a time, the second number expressed as $$\binom{N(1,\ldots,k)_{CW}}{2},$$

where $N(1, \ldots, k)_{CW}$ represents a number of nodes in the sequence $(1, \ldots, k)_{CW}$.

3. The method of claim 1, wherein forming a protection light-trail further comprises configuring one or more protection switches of one or more nodes upstream of the failed span, the configured switches operable to:
split the traffic to yield a plurality of copies of the traffic;
provide a first copy to the upstream remnant segment; and
provide a second copy to the wrap-around segment.

4. The method of claim 1, wherein forming a protection light-trail further comprises configuring one or more switches of one or more nodes downstream from the failed span, the configured switches operable to:
receive traffic from the downstream remnant segment;
receive traffic from the wrap-around segment; and
combine the received traffic.

5. The method of claim 1, wherein communicating the traffic through the protection light-trail further comprises:
routing a connection having a source node in the upstream remnant segment and having a destination node in the downstream remnant segment through the wrap-around segment.

6. The method of claim 1, wherein communicating the traffic through the protection light-trail further comprises:
routing a connection having a source node in the upstream remnant segment and a destination node in the upstream remnant segment through the upstream remnant segment.

7. The method of claim 1, wherein communicating the traffic through the protection light-trail further comprises:
routing a connection having a source node in a downstream remnant segment and a destination node in the downstream remnant segment through the downstream remnant segment.

8. A computer readable medium for providing protection for a network, a logic embodied in the medium and operable to:
establish a light-trail through a sequence of nodes of an optical network, the sequence of nodes coupled by a first fiber and by a second fiber, the first fiber comprising a first optical fiber, the second fiber comprising a second optical fiber, each fiber passing through a transport element of each node, each node of the light-trail comprising a wavelength blocking unit;
configure the wavelength blocking units of a beginning node of the light-trail and an end node of the light-trail to block a plurality of optical signals of a common wavelength;
configure the wavelength blocking units of a plurality of intermediate nodes of the light-trail to allow the plurality of optical signals of the common wavelength;
communicate traffic through a plurality of connections of the light-trail, the traffic comprising the plurality of optical signals of the common wavelength, a connection operable to communicate traffic from a source node of the sequence of nodes, through one or more intervening nodes of the sequence of nodes, to one or more destination nodes of the sequence of nodes using the common wavelength;
detect that the light-trail has a failure;
establish a protection light-trail corresponding to the light-trail, the protection light-trail configured to communicate the traffic comprising the plurality of optical signals of the common wavelength, the establishing the protection light-trail corresponding to the light-trail further comprising:
determine a failed span comprising the failure, the first fiber comprising an upstream remnant segment and a downstream remnant segment, the upstream remnant upstream from the failure, the downstream remnant downstream from the failure;
create a wrap-around segment from a portion of the second fiber, the wrap-around segment comprising a loop-back path of the failed span; and
establish the protection light-trail from the upstream remnant segment, the wrap-around segment, and the downstream remnant segment; and
communicate the traffic of the plurality of connections through the protection light-trail.

9. The computer readable medium of claim 8, wherein:
the sequence of nodes comprises a first number k of nodes; and
the plurality of connections comprises a second number of connections, the second number equivalent to a combination of the first number k taken two at a time, the second number expressed as $$\binom{N(1,\ldots,k)_{CW}}{2},$$

where $N(1, \ldots, k)_{CW}$ represents a number of nodes in the sequence $(1, \ldots, k)_{CW}$.

10. The computer readable medium of claim 8, the logic further operable to form a protection light-trail by configuring one or more protection switches of one or more nodes upstream of the failed span, the configured switches operable to:
split the traffic to yield a plurality of copies of the traffic;
provide a first copy to the upstream remnant segment; and
provide a second copy to the wrap-around segment.

11. The computer readable medium of claim 8, the logic further operable to form a protection light-trail by configuring one or more switches of one or more nodes downstream from the failed span, the configured switches operable to:
receive traffic from the downstream remnant segment;
receive traffic from the wrap-around segment; and
combine the received traffic.

12. The computer readable medium of claim 8, the logic further operable to communicate the traffic through the protection light-trail by:
routing a connection having a source node in the upstream remnant segment and having a destination node in the downstream remnant segment through the wrap-around segment.

13. The computer readable medium of claim 8, the logic further operable to communicate the traffic through the protection light-trail by:
routing a connection having a source node in the upstream remnant segment and a destination node in the upstream remnant segment through the upstream remnant segment.

14. The computer readable medium of claim 8, the logic further operable to communicate the traffic through the protection light-trail by:

routing a connection having a source node in a downstream remnant segment and a destination node in the downstream remnant segment through the downstream remnant segment.

15. An optical network operable to carry optical traffic in a plurality of multiplexed wavelengths, the optical network comprising:
a plurality of nodes comprising a sequence of nodes through which a light-trail is established, the sequence of nodes coupled by a first fiber and by a second fiber, the first fiber comprising a first optical fiber, the second fiber comprising a second optical fiber, each fiber passing through a transport element of each node, each node of the light-trail comprising a wavelength blocking unit, the plurality of nodes operable to:
configure the wavelength blocking units of a beginning node of the light-trail and an end node of the light-trail to block a plurality of optical signals of a common wavelength;
configure the wavelength blocking units of a plurality of intermediate nodes of the light-trail to allow the plurality of optical signals of the common wavelength; and
communicate traffic through a plurality of connections of the light-trail, the traffic comprising the plurality of optical signals of the common wavelength, a connection operable to communicate traffic from a source node of the sequence of nodes, through one or more intervening nodes of the sequence of nodes, to one or more destination nodes of the sequence of nodes using the common wavelength;
at least one node of the plurality of nodes operable to:
detect that the light-trail has a failure; and
establish a protection light-trail corresponding to the light-trail, the protection light-trail configured to communicate the traffic comprising the plurality of optical signals of the common wavelength, the establishing the protection light-trail corresponding to the light-trail further comprising:
determine a failed span comprising the failure, the first fiber comprising an upstream remnant segment and a downstream remnant segment, the upstream remnant upstream from the failure, the downstream remnant downstream from the failure;
create a wrap-around segment from a portion of the second fiber, the wrap-around segment comprising a loop-back path of the failed span; and
establish the protection light-trail from the upstream remnant segment, the wrap-around segment, and the downstream remnant segment; and
the plurality of nodes further operable to:
communicate the traffic of the plurality of connections through the protection light-trail.

16. The system of claim 15, wherein:
the sequence of nodes comprises a first number k of nodes; and
the plurality of connections comprises a second number of connections, the second number equivalent to a combination of the first number k taken two at a time, the second number expressed as $$\binom{N(1,\ldots,k)_{CW}}{2},$$

where $N(1,\ldots,k)_{CW}$ represents a number of nodes in the sequence $(1,\ldots,k)_{CW}$.

17. The system of claim 15, the at least one node operable to form a protection light-trail by configuring one or more protection switches of one or more nodes upstream of the failed span, the configured switches operable to:
split the traffic to yield a plurality of copies of the traffic;
provide a first copy to the upstream remnant segment; and
provide a second copy to the wrap-around segment.

18. The system of claim 15, the at least one node operable to form a protection light-trail by configuring one or more switches of one or more nodes downstream from the failed span, the configured switches operable to:
receive traffic from the downstream remnant segment;
receive traffic from the wrap-around segment; and
combine the received traffic.

19. The system of claim 15, the plurality of nodes operable to communicate the traffic through the protection light-trail by:
routing a connection having a source node in the upstream remnant segment and having a destination node in the downstream remnant segment through the wrap-around segment.

20. The system of claim 15, the plurality of nodes operable to communicate the traffic through the protection light-trail by:
routing a connection having a source node in the upstream remnant segment and a destination node in the upstream remnant segment through the upstream remnant segment.

21. The system of claim 15, the plurality of nodes operable to communicate the traffic through the protection light-trail by:
routing a connection having a source node in a downstream remnant segment and a destination node in the downstream remnant segment through the downstream remnant segment.

22. A system for providing protection for a network, comprising:
means for establishing a light-trail through a sequence of nodes of an optical network, the sequence of nodes coupled by a first fiber and by a second fiber, the first fiber comprising a first optical fiber, the second fiber comprising a second optical fiber, each fiber passing through a transport element of each node, each node of the light-trail comprising a wavelength blocking unit;
means for configuring the wavelength blocking units of a beginning node of the light-trail and an end node of the light-trail to block a plurality of optical signals of a common wavelength;
means for configuring the wavelength blocking units of a plurality of intermediate nodes of the light-trail to allow the plurality of optical signals of the common wavelength;
means for communicating traffic through a plurality of connections of the light-trail, the traffic comprising the plurality of optical signals of the common wavelength, a connection operable to communicate traffic from a source node of the sequence of nodes, through one or more intervening nodes of the sequence of nodes, to one or more destination nodes of the sequence of nodes using the common wavelength;
means for detecting that the light-trail has a failure;
means for establishing a protection light-trail corresponding to the light-trail, the protection light-trail configured to communicate the traffic comprising the plurality of optical signals of the common wavelength, the establishing the protection light-trail corresponding to the light-trail further comprising:

determining a failed span comprising the failure, the first fiber comprising an upstream remnant segment and a downstream remnant segment, the upstream remnant upstream from the failure, the downstream remnant downstream from the failure;

creating a wrap-around segment from a portion of the second fiber, the wrap-around segment comprising a loop-back path of the failed span; and establishing the protection light-trail from the upstream remnant segment, the wrap-around segment, and the downstream remnant segment; and means for communicating the traffic of the plurality of connections through the protection light-trail.

23. A method for providing protection for a network, comprising:

communicating traffic through a light-trail established through a sequence of nodes of an optical network, the sequence of nodes coupled by a first fiber and by a second fiber, the first fiber comprising a first optical fiber, the second fiber comprising a second optical fiber, each fiber passing through a transport element of each node, each node of the light-trail comprising a wavelength blocking unit, the wavelength blocking units of a beginning node of the light-trail and an end node of the light-trail configured to block a plurality of optical signals of a common wavelength, the wavelength blocking units of a plurality of intermediate nodes of the light-trail configured to allow the plurality of optical signals of the common wavelength, the traffic flowing through the first fiber from upstream to downstream, the traffic comprising the plurality of optical signals of the common wavelength, the sequence of nodes comprising a first number k of nodes, the light-trail operable to support a second number of connections, a connection operable to communicate traffic from a source node of the sequence of nodes, through one or more intervening nodes of the sequence of nodes, to one or more destination nodes of the sequence of nodes using the common wavelength; the second number equivalent to a combination of the first number k taken two at a time, the second number expressed as $$\binom{N(1,\ldots,k)_{CW}}{2},$$

where $N(1, \ldots, k)_{CW}$ represents a number of nodes in the sequence $(1, \ldots, k)_{CW}$;

detecting that the light-trail has a failure;

establishing a failed span comprising the failure, the first fiber comprising an upstream remnant segment and a downstream remnant segment, the upstream remnant upstream from the failure, the downstream remnant downstream from the failure;

creating a wrap-around segment from a portion of the second fiber, the wrap-around segment comprising a loop-back path of the failed span;

forming a protection light-trail from the upstream remnant segment, the wrap-around segment, and the downstream remnant segment, the protection light-trail configured to communicate the traffic comprising the plurality of optical signals of the wavelength, forming the protection light-trail further comprising:

configuring one or more protection switches of one or more nodes upstream of the failed span, the configured switches operable to:

split the traffic to yield a plurality of copies of the traffic;

provide a first copy to the upstream remnant segment; and provide a second copy to the wrap-around segment;

configuring one or more switches of one or more nodes downstream from the failed span, the configured switches operable to:

receive traffic from the downstream remnant segment;

receive traffic from the wrap-around segment; and combine the received traffic; and communicating the traffic of the connections through the protection light-trail by:

routing a first connection having a first source node in the upstream remnant segment and having a first destination node in the downstream remnant segment through the wrap-around segment;

routing a second connection having a second source node in the upstream remnant segment and a second destination node in the upstream remnant segment through the upstream remnant segment; and routing a third connection having a third source node in a downstream remnant segment and a third destination node in the downstream remnant segment through the downstream remnant segment.

* * * * *